Jan. 1, 1935.    R. W. McLEAN    1,986,277
GUMMING APPLIANCE
Filed Sept. 5, 1933

Inventor
Robert W. McLean
by Roberts Cushman Woodbury
Attys.

Patented Jan. 1, 1935

1,986,277

UNITED STATES PATENT OFFICE 1,986,277

GUMMING APPLIANCE

Robert W. McLean, Bridgewater, Mass., assignor to Carver Cotton Gin Company, East Bridgewater, Mass., a corporation of Massachusetts Application September 5, 1933, Serial No. 688,144

5 Claims. (Cl. 76—32)

This invention pertains to gumming appliances for use in gumming saw blades, and is particularly intended for use in a saw gumming machine of the type disclosed in my copending application for Letters Patent Serial No. 688,145, filed September 5, 1933; but I contemplate that in its broader aspects it may have usefulness in gumming machines of specifically different character or in other mechanisms or relationships.

In gumming a gin saw cylinder, according to the mode of procedure described in my aforesaid application, the gumming instrumentality, here specifically disclosed as a cutter or file, is advanced always in the same direction while actually cutting, from one saw blade of the series to another. After a given cutter of the saw passes the last saw at the end of the cylinder, it is returned to the opposite end of the series without contact with the saws, ready to begin another cutting operation. In order expeditiously to cut or deepen the notches between adjacent teeth of the saw blade, which is the purpose of the gumming operation, it is desirable to cut material from both sides of the tooth notch at the same time, and to this end I provide a cutter adapted simultaneously to cut away material at opposite edges of the notch by the same advancing movement of the cutter.

Since in accordance with my preferred method of procedure the cutter is moved in a continuous or closed path, conveniently being carried on an endless chain passing about suitable guide wheels or the like, it is necessary to limit the length of the cutter so as to insure the desired flexibility of the chain, and at the same time it is desirable to have the cutter rigidly supported while in contact with the work. With these limiting factors in view, I make my cutter of relatively thin, substantially flat steel plate having one margin at least beveled to provide inclined outwardly convergent surfaces preferably meeting substantially in the mid-plane of the cutter body, such surfaces having teeth cut thereon, and I provide the body portion with openings or equivalent elements for cooperation with bolts or other suitable means for clamping the cutter between a pair of rigid and accurately finished clamping elements constituting parts of a cutter holder. Furthermore, in order that the cutter may cut both edges of the tooth notch simultaneously during advance of the cutter in a given direction, I preferably arrange the cutting teeth on both of the beveled faces of the cutter to lean in the same direction so that the cutting edges of the teeth of both series are directed toward the same end of the cutter.

As damage might result were the advancing end of the cutter to strike end-on against the face of a saw disk, I propose to cut away the corner of the cutter, at least at the advancing end thereof, to provide a cam-like surface adapted, if the saw and cutter are not accurately positioned as they approach, to ease the contact between them and gradually bring the parts into proper relationship so that the cutter may perform its intended function.

In the accompanying drawing, wherein certain desirable embodiments of the invention are illustrated by way of example, Fig. 1 is a top plan view of a preferred form of my improved cutter;

Figure 1:
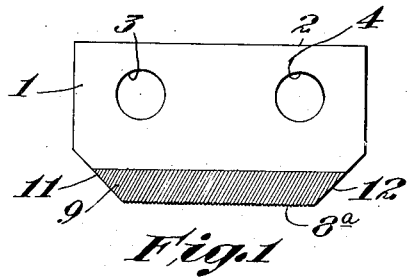
Figure 2:
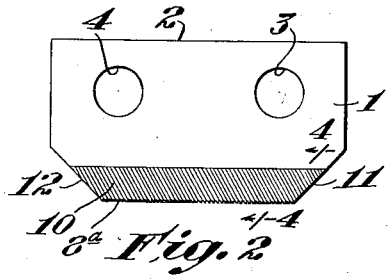
Fig. 2 is a bottom view of the same cutter.
Figure 3:
Fig. 3 is an end elevation of the cutter looking from the right-hand side of Fig. 1, for example.
Figure 4:
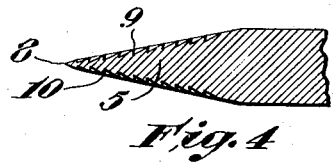
Fig. 4 is a fragmentary section, to greatly enlarged scale, substantially on the line 4—4 of Fig. 2, showing the arrangement of the cutter teeth.
Figure 5:
Fig. 5 is an edge elevation of the cutter of Fig. 1.

Referring to the drawing, the cutter body 1 is preferably made from a piece of relatively thin steel plate of substantially uniform thickness and of a character suitable for use in making cutters or files for cutting or filing metal such as that of a saw blade. This body portion 1 is preferably substantially rectangular and somewhat elongate, and has a rear substantially straight margin 2. The body portion is also furnished with openings 3 and 4 or other equivalent means for the reception of a clamping element or elements. At its forward part the body of the cutter is furnished with a margin 5, which is substantially V-shape in vertical cross section, having the upper inclined surface 6 and the lower inclined surface 7, such surfaces preferably converging to a substantially straight edge 8. While this V-shaped margin is of substantially isosceles triangular shape, in vertical section, as here illustrated, it is contemplated that for cutting tooth notches of unsymmetrical shapes, it may be desirable to incline one of the surfaces 6 with respect to the plane of the body portion at a different angle from that which the other surface 7 makes with the plane of the body portion.

In accordance with a preferred procedure, the edge 8 is first provided with fine teeth $8^a$, and thereafter on each of the faces 6 and 7 is cut a series of teeth 9 and 10, respectively. These teeth may be formed in any approved manner, for example by milling;—or, as file teeth, by a method known to those skilled in the file-making art. As here illustrated the teeth are typical file teeth, and the teeth of both series are so arranged that their cutting edges lean toward the same end of the cutter, or, as it may for convenience be referred to, the file. Preferably also these file teeth are inclined or make an acute angle with the edge 8, the teeth of both series meeting this edge at substantially the same angle, the cutter or file being heat-treated to harden it in any approved manner after the teeth have been cut. While I suggest the use of a cutter having metallic teeth as most desirable, I contemplate the use of a cutter having cutting elements of some non-metallic abrasive as within the purview of the invention.

Preferably both ends of the beveled margin 5 of the cutter are cut away, as shown at 11 and 12, respectively, so as to furnish cam-like surfaces thereby to prevent abrupt and injurious contact of the end of the cutter or file as the latter is advanced toward the saw blade.

While I contemplate that this improved cutter may be supported in other ways and by other means than that herein illustrated, I prefer to employ a file holder or carrier comprising a body 13 of substantially rigid material, for example cast-iron, and as here illustrated this body portion is furnished with inclined guide surfaces 14 and 15 at its upper edge, and with inclined guide surfaces 16 and 17 at its lower edge, such surfaces being intended to engage and to slide along suitable guides provided in the gumming machine, as pointed out more particularly in my copending application above referred to. Preferably the body portion 13 is furnished with an opening or openings 18 for the reception of a suitable drive member, for example, a pin (not shown) carried by a chain link, such pin being secured to the body portion of the holder by means of a cotter which may be passed down through a bore 19 in the body portion, such bore intersecting the opening 18.

The body portion of the holder is furnished with a forwardly projecting shelf 20 preferably integral with said body portion, such shelf projecting from a substantially vertical finished abutment surface 21. The under side of the shelf is preferably provided with a pair of spaced finished surfaces 22 and 23 disposed in a plane perpendicular to the surface 21 and adapted to engage the upper surface of the body of the cutter or file. A clamping member 24, also preferably rigid and of cast-iron or the like, is furnished with a pair of spaced finished surfaces 25 and 26 adapted to engage the under surface of the file body 1. The shelf 20 is provided with a pair of spaced openings $3^a$ and $4^a$, and the removable clamping member 24 is furnished with a pair of spaced openings $3^b$ and $4^b$, the latter openings preferably being screw-threaded. The openings in the shelf 20 and in the clamping member 24 are adapted to register with the openings 3 and 4 in the file body, and bolts 27 are passed down through the openings in the shelf 20 and through those in the cutter or file body and into engagement with the screw-threaded openings of the clamping member. When tightened these bolts hold the parts securely in assembled relation with the cutter or file body firmly clamped between rigid parts, but leaving its beveled margin 5 with its file teeth exposed for contact with the saws as the holder is moved along the guideway. When a file is worn it is merely necessary to loosen the bolts 27, whereupon the clamping plate 24 may be removed and the worn file exchanged for a new one.

When clamped in position, the rear margin 2 of the cutter bears against the surface 21 of the holder, thus furnishing a rigid abutment to take the thrust of the cutter during the cutting action, such thrust, in turn, being sustained by the guides which engage the guide surfaces of the holder.

Figure 9:
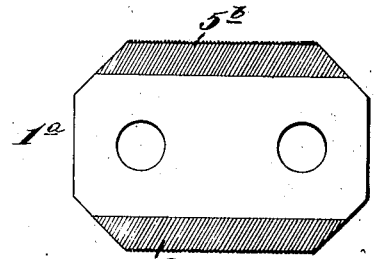
Fig. 9 is a view similar to Fig. 1 but illustrating a modified form of cutter.
Figure 6:
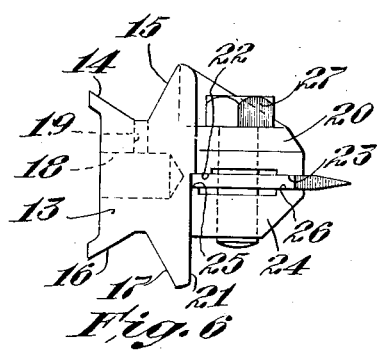
Fig. 6 is an end elevation of a cutter holder or carrier of desirable construction having the cutter mounted therein.
Figure 7:
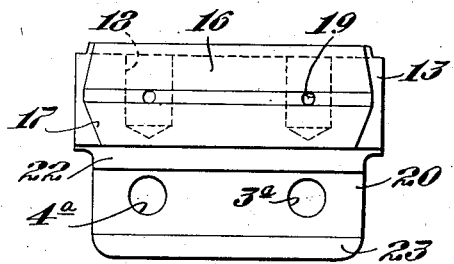
Fig. 7 is a bottom plan view of the cutter holder of Fig. 6, omitting the cutter and the removable clamping element.
Figure 8:
Fig. 8 is a plan view of the clamping element removed from the holder.

In Fig. 9 I have illustrated a slight modification of my cutter in which the body portion $1^a$ is furnished with beveled margins $5^a$ and $5^b$ at its front and rear edges, respectively, each of said margins being furnished with file teeth. Such a cutter, after the teeth are worn at one margin, may be taken out and reversed edge for edge, so as to give double the wear of the file of Fig. 1.

While the embodiments of the invention herein illustrated are desirable and preferable for the specific purpose of gumming gin saw cylinders, I contemplate that cutters or files of generally similar type, but modified for other particular uses, may be made within the scope of my invention as set forth in the appended claims.

I claim:

1. A saw gumming device comprising a substantially rectangular body portion of steel plate having one margin, at least, beveled to provide upper and lower inclined faces, each of said faces having a series of teeth thereon, said margin having its opposite ends beveled to prevent abrupt and injurious contact with the saw teeth.

2. A saw gummer device for use in a machine of the class described, said device comprising a body portion having means for securing it to a holder, and having a marginal portion of substantially V-shape in vertical cross section, the upper and lower surfaces of said marginal portion having teeth cut thereon, said surfaces meeting in a substantially rectilinear edge, said marginal portion having one end at least beveled to prevent abrupt and injurious contact with the saw teeth.

3. A gumming cutter comprising an elongate substantially rectangular piece of steel plate having a body portion provided with a beveled margin of substantially V-shape in a section perpendicular to the plane of the blade, the inclined faces of said margin meeting in a substantially straight edge, said faces having teeth cut thereon, the body portion having an opening therethrough, and in combination with said cutter, a holder therefor comprising a substantially rigid body portion having finished surfaces for engagement with the rear edge and with one side of the cutter respectively, and a clamping element having a surface for engagement with the other side of the cutter, and clamping means comprising a part adapted to pass through an opening in the cutter body and to clamp the cutter between the body portion of the holder and said clamping element.

4. A gumming cutter comprising a piece of steel plate having a substantially rectangular body portion provided with a beveled margin having convergent surfaces meeting substantially in a straight toothed edge at the mid-plane of the body portion, the opposite margin of the body portion being substantially straight, the body portion having a plurality of openings therethrough and the beveled margin being cut away at its opposite ends to provide cam surfaces, said beveled margin having teeth on its upper and lower surfaces, and in combination therewith a holder comprising a rigid body portion provided with guide-engaging surfaces and with elements whereby it may be moved along suitable guides, said rigid body portion of the holder having two surfaces substantially perpendicular to each other, one of said surfaces forming an abutment for the rear margin of the cutter, and the other furnishing a rest for engagement with one face of the cutter body, a rigid clamping member having a surface for engagement with the other side of the cutter body, and bolts arranged to pass through the openings in the cutter body and to clamp the cutter between said clamping member and the surface of the body portion of the holder.

5. A saw gummer device for use in a machine of the class described, said device comprising a body portion of steel plate, said plate having a pair of substantially parallel marginal portions each of substantially V-shape in transverse cross section, the upper and lower faces of each marginal portion respectively meeting in a substantially rectilinear edge, each of such faces having a series of teeth thereon, and each of said marginal portions having one end at least beveled to prevent abrupt and injurious contact with the saw teeth.

ROBERT W. McLEAN.